United States Patent Office 3,326,887
Patented June 20, 1967

3,326,887
MONOAZO TRIAZINE DYESTUFFS
Henri Riat, Arlesheim, and Karl Seitz, Allschwil, Switzerland, assignors to Ciba Limited, Basel Switzerland, a company of Switzerland
No Drawing. Filed Oct. 11, 1965, Ser. No. 494,898
Claims priority, application Switzerland, Nov. 17, 1961, 13,383/61; Sept. 21, 1962, 11,159/62
7 Claims. (Cl. 260—153)

This is a continuation in part of application Ser. No. 237,324, filed Nov. 13, 1962 and now abandoned.

The present invention provides new, valuable monoazo dyestuffs of the formula (1) 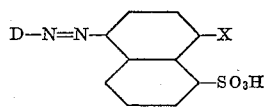

in which D represents the radical of a diazo component that advantageously contains at least two rings and sulfonic acid groups, and X represents a monohalogen triazine radical or an at least dihalogenated pyrimidine radical bound to the coupling component through a nitrogen bridge, especially a bridge of the formula

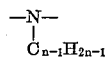

in which $n$ represents a positive integer, advantageously 1.

The invention provides more especially dyestuffs of the Formula 1, in which X represents a radical of the formula (2) 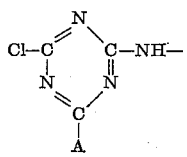

in which A represents the radical of a hydroxyl or mercapto compound bound through the oxygen or sulfur atom or more especially an amino group i.e. the radical of an amino compound bound through the nitrogen atom, and which, if it is aromatic, advantageously contains a strongly acidic group imparting solubility in water.

The new monoazo dyestuffs can be prepared in such a manner that monoazo dyestuffs of the formula (3) 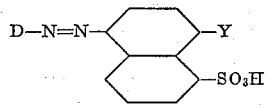

in which D represents the radical of a diazo component having advantageously two to six rings which may be fused together, and one to four sulfonic acid groups and Y represents an acylatable amino group, especially a group of the formula

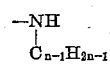

in which $n$ represents a positive integer, advantageously 1, are reacted in the normal manner with a dihalogen triazine or with an at least dihalogenated pyridine, for example, with 2:4:6-tri- or 2:4:5:6-tetrachloropyrimidine, 5 - bromo - 2:4:6-trichloropyrimidine, 5-acetyl-2:4:6-trichloropyrimidine, 2:4 - dichloropyrimidine - 5 - sulfonic acid, 5 - nitro or 5-cyano-2:4:6-trichloropyrimidine, 5-nitro - 6 - methyl - 2:4 - dichloropyrimidine, 2:6 - dichloropyrimidine - 4 - carboxylic acid chloride or 2:4-dichloropyrimidine - 5 - sulfonic acid chloride, and with the corresponding bromopyrimidines, but more especially with 2-methyl-, 2-ethyl- or 2-phenyl-4:6-dichlorotriazine and especially with dichlorotriazines of the formula

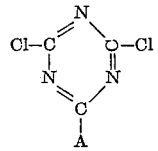

in which A has the meaning ascribed to it in Formula 2, and also with the corresponding bromotriazine derivatives. A preferred method of carrying out the process consists in first reacting monoazo dyestuffs of the Formula 3 with cyanuric chloride or cyanuric bromide and then replacing a halogen atom in the resulting dihalogen triazine compounds with the radical A.

Dihalogen triazines of the Formula 4 can be made by methods in themselves known, for example, by reacting 1 mol of cyanuric chloride with 1 mol of ammonia or with 1 mol of a reactive organic compound, especially at an at most secondary amine which contains up to 12 carbon atoms and, if it is aromatic, advantageously also contains at least one acidic group imparting solubility in water. As such compounds there may be used, for example, aliphatic or aromatic mercapto or hydroxyl compounds, such as thioalcohols, thioglycollic acid, thiourea, thiophenols, mercaptobenzthiazoles, methyl-, ethyl- or isopropyl-alcohol, glycollic acid, phenol, chlorophenols, nitro-phenols, phenolcarboxylic acids, phenol sulfonic acids, naphthols, naphthol sulfonic acids and so on, but especially ammonia and compounds containing acylatable amino groups, such as hydroxylamine, hydrazine, phenylhydrazine, phenylhydrazine sulfonic acids, carbamic acid and its derivatives, semi- and thio-semi-carbazides and carbazones, methyl-amine, ethylamine, methoxyethylamine, methoxypropylamine, dimethylamine, diethylamine, methylphenylamine, ethylphenylamine, chlorethylamine, ethanolamines, propanolamines, benzylamine, cyclohexylamine, morpholine, piperidine, piperazine, aminocarbonic acid esters, amino acetic acid ethylester, aminoethane sulfonic acid, N-methylaminoethane sulfonic acid, but more especially aromatic amines, such as aniline, N-methylaniline, toluidines, xylidines, chloranilines, para- or metaaminoacetanilide, nitranilines, aminophenols, nitrotoluidines, phenylenediamines, toluylene-diamines, anisidine, phenetidine, diphenylamine, naphthylamines, aminonaphthols, diaminonaphthalenes, and especially anilines containing acidic groups, such as p-amino benzene sulfonic acid, m-amino benzene sulfonic acid, o-amino benzene sulfonic acid, aniline disulfonic acids, aminobenzoic acids, naphthylamino-mono-, di- and trisulfonic acids, aminohydroxybenzoic acids, such as 1-hydroxy - 5 - aminobenzoic acid, aminonaphtholmonosulfonic acids, aminonaphthol disulfonic acids and aminonaphthol trisulfonic acids and so on.

The condensation of the said halogen triazine compounds with the dyestuffs of the Formula 3 is carried out by methods in themselves known, advantageously in the presence of an agent capable of binding acid, such as sodium acetate, sodium hydroxide or sodium carbonate, and under conditions that ensure that at least one replaceable halogen atom remains in the final product, that is to say, for example, in the presence of an organic solvent or at a relatively low to a moderately raised temperature in an aqueous medium.

If, in accordance with the preferred method, the reaction is first carried out with a cyanuric halide, especially cyanuric chloride, the dihalogentriazine compound first formed must, as already mentioned, be converted into a monohalogentriazine compound by the subsequent replacement of a further halogen atom by one of the radical defined under A in the Formula 2. The reactants used in this specially advantageous mode of preparation are the above-mentioned mercapto, hydroxyl and amino compounds, and the reaction is advantageously carried out under the conditions given above.

Monoazo dyestuffs of the Formula 3 can be obtained by methods in themselves known by coupling any diazo component that advantageously contains sulfonic acid groups and that is at least bicyclic with a naphthalene-α-sulfonic acid that contains in periposition to the sulfonic acid group an acylatable amino group that causes coupling to take place in paraposition. Advantageously, a diazo component is chosen that ensures that the final dyestuff molecule contains at least two sulfonic acid groups. As such diazo components there may be used, for example, those that are derived from amines of mono to hexacyclic compounds i.e. from mono-, di-, tri-, tetra-, penta- or hexacyclic amines of the aromatic or heterocyclic series, such as the amines of the benzene series, for example, those derived from aniline, ortho-, meta- and para-toluidine, ortho-, meta- and para-anisidine, meta- and para-nitraniline, meta- and para-aminoacetanilide, 5-chloro-2-aminoanisole, 2-trifluoromethyl aniline, 2-aminophenol, 2-aminophenol-4-ethylsulfone, 3-amino-4-hydroxy-acetophenone, 4- and 5-nitro-2-aminophenol, 4:6-dinitro-2-aminophenol, 4-chloro-2-aminophenol,2-aminophenol-4-sulfonic acid amide, 2-aminophenol-4-sulfonic acid methylamide, aniline - 2 - sulfonic acid amide, aniline - 2-sulfonic acid ethyl amide, 2 - amino - phenylethylsulfone, aniline-2-, -3- and -4-carboxylic acid and esters thereof, such as methyl- and butyl-anthranilic acid esters, 4- and 5 - sulfo - 2 - aminobenzoic acid, 5 - chloro - 2 - aminobenzoic acid, 5 - nitro - 2 - aminobenzoic acid, 4- and 5-aminosalicyclic acid, orthoaniline sulfonic acid, meta-aniline sulfonic acid, sulfanilic acid, aniline-2:4-, -2:5- and -3:5-disulfonic acids, 4 - methylaniline - 2 - sulfonic acid 5 - methylaniline - 2-sulfonic acid, 2 - methylaniline-5-sulfonic acid 2:4 - dimethylaniline - 6 - sulfonic acid, 4-methylaniline - 2:5-, -3:5- and -2:6-disulfonic acids, 2-methylaniline - 4:6 - disulfonic acid, 4 - methoxyaniline-2-sulfonic acid, 5 - methoxyaniline - 2 - sulfonic acid, 2 - methoxyaniline-5-sulfonic acid, 2:4-dimethoxyaniline-6 - sulfonic acid, 4 - chloraniline - 2 - sulfonic acid, 4:5-dichloranilne - 2 - sulfonic acid, 2:5 - dichloraniline-4-sulfonic acid, 4 - acetylamino-aniline-2-sulfonic acid, 5-acetylaminoaniline - 2-sulfonic acid, 4-trifluoromethylanilene - 2 - sulfonic acid, 4-chloro-5-methylaniline-2-sulfonic acid, 3 - chloro - 2 - methylaniline-4:6-disulfonic acid, 5-chloro - 4 - methylanilne-2-sulfonic acid, 4-nitroaniline-2-sulfonic acid, 5-nitroaniline-2-sulfonic acid, 4-nitro-2-methoxyaniline-5-sulfonic acid, 5-amino-2-methylacetanilide - 4 - sulfonic acid, 2 - aminophenol-4-sulfonic acid, 2-aminophenol-4:6-disulfonic acid, 4-nitro-2-aminophenol-6-sulfonic acid, 6-nitro-2-aminophenol 4-sulfonic acid, 4-chloro-2-aminophenol-6-sulfonic acid, 6-chloro-2-aminophenol-4-sulfonic acid, and more especially all those that are derived from amines of polycyclic compounds, for example, from 2 - amino - 2' - methyldiphenylether, 2-aminodiphenylsulfone, 4 - aminodiphenylamine, 3- and 2-aminobenzanilide, 3'- and 4'-aminobenzanilide, 1- and 2-naphthylamine, 1- and 2 - amino-anthraquinone, aminodiphenylamine sulfonic acids, 4-amino- 4'-nitrodiphenylamine - 2'-sulfonic acid, 3'- and 4'-aminobenzanilide-3- and -4-sulfonic acids, 4-aminodiphenyl-3- and -4'-sulfonic acids, 4' - nitro - 4 - aminostilbene-2:2'-disulfonic acid, 4' - acetylamino - 4 - aminostilbene-2:2'-disulfonic acid, 4'-benzoylamino - 4 - aminostilbene - 2.2'-disulfonic acid, 4' - chloro - 4 - aminostilbene 2.2'-disulfonic acid, 4'-bromo - 4 - aminostilbene - 2:2' - disulfonic acid, 4'-dimethylamino - 4 - aminostilbene - 2:'-disulfonic acid, 4' - anilino - 4 - aminostilbene - 2:2' - disulfonic acid, 2 - (4''' - aminostilbenyl) - naphtho - 1':2:4:5-triazole-2'':2''':5':7' - tetrasulfonic acid, 1 - naphthylamine-4,-5-, -6- and -7- monosulfonic acids, 2-naphthylamine-1-,-6-, -7- and -8- monosulfonic acids, 1 - naphthylamine- 2:4-, -2:5-, -3:6- and -3:8-disulfonic acids, 2-naphthylamine-1:5-, 3:6-, -4:8-, -5:7- and -6:8-disulfonic acids, 1-naphthylamine - 2:4:6- and -2:5:7-trisulfonic acids, 2-naphthylamine - 1:5:7-, -4:6:8- and -3:6:8-trisulfonic acids, 2-naphthylamine - 6 - acetylamino- 4:8-disulfonic acid, 2 - naphthylamine - 6 - nitro-4:8-disulfonic acid, 2 - methoxy - 1 - naphthylamine-6- and -7-sulfonic acids, 1 - amino - 2 - naphthol - 4 - sulfonic acid, 1-amino-6-nitro - 2 - naphthol - 4 - sulfonic acid, 1 - aminopyrene-monosulfonic acid, 3 - aminopyrene - 5:8- or 5:10-disulfonic acids, 3 - aminopyrene - 5:8:10-trisulfonic acid, 3-amino-chrysenesulfonic acid, or those that are derived from heterocyclic amines, for example, from 3-aminopyridine, 4-, 5- and 6-amino-indazoles, 5-nitro-2-aminothiazole, 6 - methyl - 2 - (4'-aminophenyl)-benzthiazole and the mono- and disulfonation compounds thereof, 6-amino-5-methoxy-2-(4'-sulfophenyl)-benztriazole, 2-(4''-aminophenyl)-naptho - 1':2':4:5-triazole - 3'':5 - disulfonic acid, 2-(4'' - aminophenyl)-naphtho-1':2':4:5-triazole - 2'':5':7' - trisulfonis acid, 2 - (3''- and 4''-aminophenyl) - naphtho - 1':2'4:5-triazole - 4:7:9 - trisulfonic acid, 2 - (4'' - aminophenyl) - naphtho-1':2':4:5-triazole-3'':4:7:9-tetrasulfonic acid, and also amines of the formula

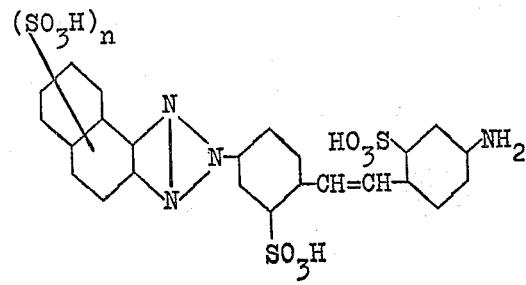

(wherein $n$ is 1 or 2).

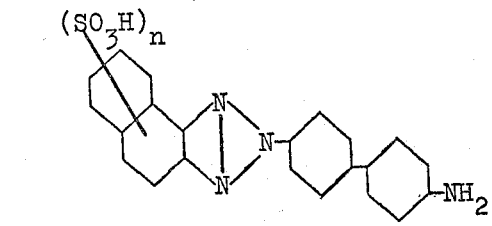

(wherein $n$ is 1 or 2).

The isolation of the dyestuffs obtained by the processes of the invention is advantageously carried out at a low temperature by salting out and filtration. The isolated dyestuffs can, if necessary, be dried after the addition of extenders or stabilizing agents; advantageously, the drying is carred out at not too high a temperature and under reduced pressure. In certain cases dry preparations can be prepared in a direct manner, that is to say, without intermediate isolation of the dyestuffs, by spray-drying the whole preparation mixture. By this method there are obtained new and valuable dry preparations that are suitable for the preparation of stock solutions or dyebaths and, if desired, printing pastes.

The dyestuffs obtained by the above described process are new. They are valuable products that are suitable for dyeing or printing a very wide variety of materials, especially polyhdroxylated material of fibrous structure, such as materials that contain cellulose, including synthetic, fibers, for example, those made from regenerated cellulose, or natural materials, for example, cellulose, linen, or more especially cotton. They are suitable for dyeing by the so-called direct method from a long liquor in an alkaline aqueous bath that may, if necessary, contain a high proportion of salt, and more especially they are suitable for application by printing and pad-dyeing processes in which the dyestuff is applied to the material to be colored by printing or by padding and is fixed thereto by means of an agent capable of binding acid, if necessary, with the application of heat. Dyeings produced on cotton with the dyestuffs of the invention are distinguished in particular by a good fastness to chlorine and by the ease with which unfixed portions of dyestuff can be washed off.

In order to improve their properties of wet fastness, it is generally of advantage to submit the dyeings and prints so obtained to a thorough rinse with cold water and hot water, if necessary, in the presence of a dispersing agent that assists diffusion of any unfixed dyestuff.

If dyeing is carried out by the so-called catalytic process in which fixation of the dyestuff on the fiber is effected with a tertiary amine such as triethylamine or bicyclo-(2:2:2)-triethylenediamine(diaza-bicyclooctane) or with another basic compund such as N:N-dimethylhydrazine, if necessary, without the application of heat, the fixation of the dyestuffs of the invention is accelerated and thus deeper dyeing can be obtained in a shorter time.

The dyestuffs of the invention are also suitable for dyeing fibrous materials containing nitrogen, such as polyamides, polyurethanes, silk, leather and more especially wool, for example, from a slightly acid, neutral or slightly alkaline bath, if necessary, in the presence of the usual assistants, for example, in the presence of ethylene oxide condensation products of amines of high molecular weight. On wool level, full dyeings possessing a good fastness to light and rubbing and also good properties of wet fas tness are thus obtained.

Unless otherwise stated, the parts and percentages in the following examples are by weight:

Example 1

30.3 parts of 2-aminonaphthalene-4:8-disulfonic acid were diazotized with 6.9 parts of soduim nitrite in a solution acidified with hydrochloric acid. The diazo solution was run into a solution of 24 parts of the ammonium salt of 1-aminonaphthalene-8-sulfonic acid in 600 parts of ice water, and the excess of mineral acid neutralized by the addition of an aqueous solution of sodium acetate. When the coupling was finished, the monoazo dyestuff was salted out and filtered off.

The dyestuff paste was dissolved in 800 parts of water, the solution neutralized with sodium hydroxide and then added to a fine suspension of 19 parts of cyanuric chloride in 200 parts of ice water and 50 parts of acetone. The pH value was maintained at 6 to 7 by the dropwise addition of a 2 N sodium hydroxide solution. When free amino groups could no longer be detected, 50 parts of an aqueous ammonia solution of 10% strength were added and the mixture stirred for 2 to 3 hours at 30 to 40° C. The monochlorotriazine dyestuff so formed was then salted out, filtered off and dried. It dissolved in water giving a yellow orange solution and dyed cotton yellow orange tints possessing a very good fastness to light and washing. The dyeing was also distinguished by an excellent fastness to chlorine.

Example 2

To the solution of the dichlorotriazine derivative of the monoazo dyestuff obtained as described in Example 1, a neutral solution of 17.3 parts of metanilic acid was added, instead of the ammonia solution and the mixture heated to 45° C., during which process the pH value was maintained between 6 and 7 by the dropwise addition of a 2N sodium hydroxide solution. On termination of the reaction, the monochlorotriazine dyestuff so formed was salted out, filtered off and dried. The dyestuff so obtained dyed cotton yellow-orange tints.

Example 3

A neutral solution of the dichlorotriazine derivative prepared from 17,3 parts of metanilic acid was added to a neutral solution of 53.7 parts of the monoazo dyestuff obtained as described in the first paragraph of Example 1. The mixture was heated to 45° C. and the pH value of the solution maintained between 6 and 7 by the dropwise addition of a 2N sodium hydroxide solution. The dyestuff so obtained dyed cotton yellow-orange tints.

In the following table, column III indicates the tints obtained with other dyestuffs that are obtained when cyanuric chloride is reacted in the manner described either in Example 1 or in Example 3 on the one hand with a monoazo dyestuff obtained by coupling 1-aminonaphthalene-8-sulfonic acid with an amine listed in column I (diazotised in the usual manner) and on the other hand, with a compound given in column II.

| I | II | III |
|---|---|---|
| 1-aminobenzene-2-sulfonic acid | NH₃ | Yellow. |
| 1-aminobenzene-2:5-disulfonic acid | NH₃ | Do. |
| Aniline | 1-aminobenzene-3-sulfonic acid | Do. |
| 4-aminobenzoic acid | do | Do. |
| 1-amino-4-acetylaminobenzene-2-sulfonic acid | NH₃ | Reddish yellow. |
| 1-amino-5-acetylaminobenzene-benzene-2-sulfonic acid | NH₃ | Yellow. |
| 1-amino-4-methoxybenzene-2-sulfonic acid | NH₃ | Do. |
| Do | 1-aminobenzene-3-sulfonic acid | Do. |
| Do | 1-aminobenzene-4-sulfonic acid | Do. |
| Do | 1-aminonaphthalene-6-sulfonic acid | Do. |
| Do | 2-aminoethanol | Do. |
| 2-aminonaphthalene-4:8-disulfonic acid | Aniline | Do. |
| Do | 2-aminobenzoic acid | Yellow-orange. |
| Do | Morpholine | Do. |
| Do | Ethylamine | Do. |
| Do | 2-aminoethanol | Do. |
| Do | Dimethylamine | Do. |
| Do | 1-aminobenzene-2-sulfonic acid | Do. |
| Do | 1-aminobenzene-2:5-disulfonic acid | Do. |
| 2-aminonaphthalene-4:6:8-trisulfonic acid | NH₃ | Orange. |
| 2-amino-6-acetylaminonaphthalene-4:8-disulfonic acid | NH₃ | Reddish-yellow. |
| 2-amino-naphthalene-1:5-disulfonic acid | NH₃ | Yellow. |
| 2-amino-naphthalene-6:8-disulfonic acid | NH₃ | Reddish-yellow. |
| 1-aminonaphthalene-3:6-disulfonic acid | NH₃ | Do. |
| Do | Phenol | Do. |
| Do | Thiophenol | Do. |
| 1-aminonaphthalene-2:5:7-trisulfonic acid | NH₃ | Brownish-yellow. |
| 2-amino-6-nitronaphthalene-4:8-disulfonic acid | NH₃ | Brownish-orange. |
| 4-amino-4'-acetylamino-stilbene-2:2'-disulfonic acid | NH₃ | Orange. |
| Do | 1-aminobenzene-3-sulfonic acid | Do. |
| Do | 1-aminobenzene-2-sulfonic acid | Do. |
| Do | Methylamine | Do. |
| Do | 2-aminoethanol | Do. |
| Do | Cyclohexylamine | Do. |
| Do | N-methylaniline sulfonic acid | Do. |
| Do | 2-amino-5-sulfobenzoic acid | Do. |

| I | II | III |
|---|---|---|
| [structure: pyrene-disulfonic acid linked via N=N imidazole to phenyl-SO3H-CH=CH-phenyl-SO3H-NH2] | NH3 | Brownish-orange. |
| [structure: pyrene-disulfonic acid linked via imidazole to phenyl-NH2] | NH3 | Reddish-yellow. |
| 3-aminopyrene-5:8- or 5:10-disulfonic acid | NH3 | Red. |
| Do | 1-aminobenzene-3-sulfonic acid | Red. |
| Do | 1-aminobenzene-2-sulfonic acid | Red. |
| 3-aminopyrene-5:8:10-trisulfonic acid | NH3 | Red. |
| Dehydrothiotoluidine-disulfonic acid | NH3 | Brownish-orange. |
| Do | 1-aminobenzene-3-sulphonic acid | Do. |
| 4-aminodiphenylamine-2-sulfonic acid | NH3 | Orange. |
| 4-aminodiphenyl-sulfonic acid | NH3 | Yellow. |
| Cl—[phenyl-SO3H]—CH=CH—[phenyl-SO3H]—NH2 | NH3 | Orange. |
| [structure: disulfo-pyrene-imidazole-stilbene-NH2] | 1-aminobenzene-3-sulfonic acid | Brownish-orange. |
| [structure: disulfo-pyrene-imidazole-stilbene-NH2] | 1-aminobenzene-4-sulfonic acid | Do. |
| [structure: sulfo-naphthalene-imidazole-stilbene-NH2] | NH3 | Do. |
| [structure: sulfo-naphthalene-imidazole-stilbene-NH2] | 1-aminobenzene-3-sulfonic acid | Do. |
| [structure: sulfo-naphthalene-imidazole-stilbene-NH2] | ......do | Do. |

| I | II | III |
|---|---|---|
| 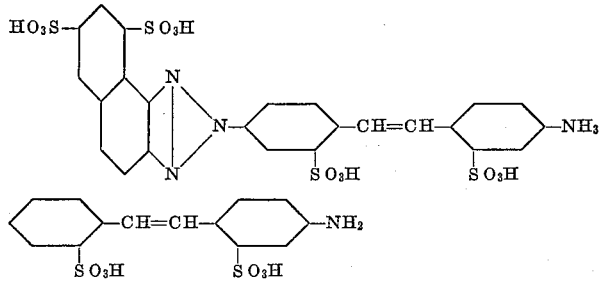 | NH₃ | Do. |
| | NH₁ | Orange. |

Example 4

26.85 parts of the dyestuff of the formula

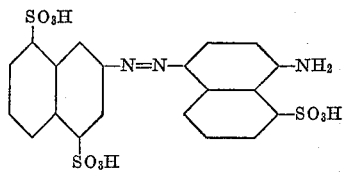

prepared as described in Example 1, were dissolved neutral in 600 parts of water. A solution of 10.9 parts of 2:4:5:6-tetrachloropyrimidine in 300 parts of alcohol was added and the reaction mixture heated for several hours at 60 to 65° C. A solution of 2.65 parts of sodium carbonate in 25 parts of water was then slowly added dropwise, whereby the pH value of the solution was brought back to 7. The dyestuff so formed was precipitated by the addition of a mixture of sodium chloride and potassium chloride and filtered off and dried.

The product so obtained dyed cotton yellow-orange tints.

Example 5

By using in Example 4, 9.2 parts of 2:4:6-trichloropyrimidine instead of the tetrachloropyrimidine and adapting the same procedure, a dyestuff which dyed cotton yellow-orange tints was obtained.

*Dyeing prescription.*—2 parts of the dyestuff obtained as described in Example 1 were dissolved in 100 parts of water.

A cotton fabric was impregnated with this solution on a padding mangle, the excess liquid being squeezed out so that the fabric retained 75% of its weight of the dyestuff solution.

The fabric so impregnated was then dried and impregnated at room temperature with a solution that contained 10 g. of sodium hydroxide and 300 g. of sodium chloride per litre; squeezed till it retained 75% of liquor and steamed for 60 seconds at 100 to 101° C. The fabric was then rinsed, treated in a sodium bicarbonate solution of 0.5% strength, rinsed, washed for 15 minutes in a 0.3% solution of a non-ionic detergent at the boil, rinsed and dried. A brilliant orange dyeing was obtained.

What is claimed is:

1. A water soluble monoazo dyestuff of the formula

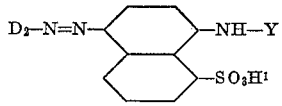

in which $D_2$ is a sulfonaphthyl radical and $Y_1$ is a 2-amino-4-chloro-1,3,5-triazine radical, whose amino group contains up to 6 carbon atoms and which is bound to the —NH-bridge in 6-position.

2. A water soluble monoazo dyestuff of the formula

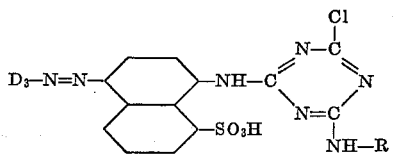

in which $D_3$ is the radical of a member selected from the group consisting of a sulfophenyl, sulfodiphenyl and a sulfopyrene radical and R is a member selected from the group consisting of a hydrogen atom and a sulfophenyl radical.

3. A water soluble monoazodyestuff of the formula

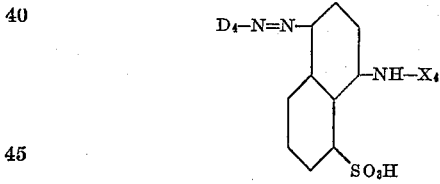

wherein $X_4$ is a 2-chloro-4-amino-1:3:5-triazinyl radical bound to the —NH-bridge in 6-position, whose amino group is selected from the group consisting of the $NH_2$ and the sulfophenyl amino radicals, and $D_4$ a member selected from the group consisting of the sulfostilbenyl and sulfonaphtha triazolyl radicals.

4. The water soluble monoazo dyestuff of the formula

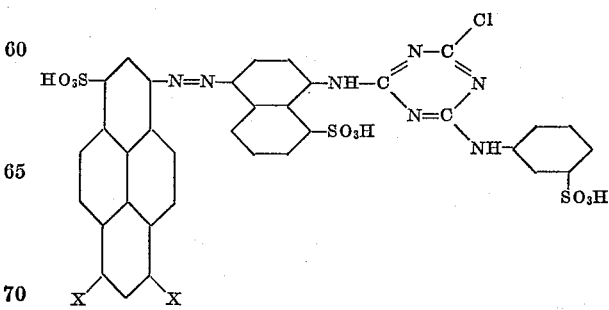

in which one X is a hydrogen atom and the other X is a sulfonic acid group.

5. The water soluble monoazo dyestuff of the formula
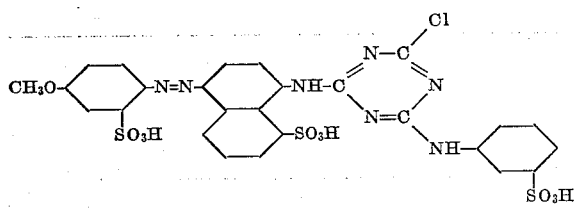
6. The water soluble monoazo dyestuff of the formula
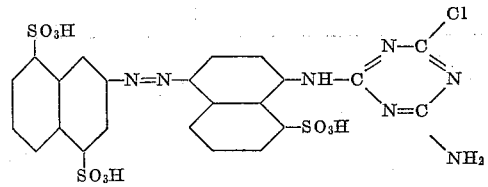
7. The watersoluble monoazo dyestuff of the formula
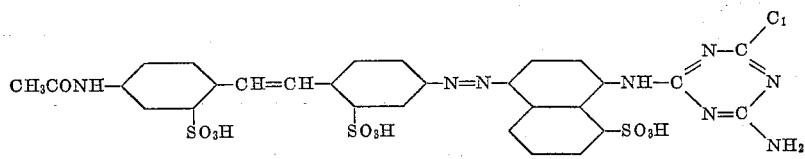
References Cited
UNITED STATES PATENTS
2,951,837   9/1960   Andrew et al. _____ 260—153
3,100,768   8/1963   Gunst _____ 260—153
CHARLES B. PARKER, *Primary Examiner.*
DONALD M. PAPUGA, *Assistant Examiner.*